United States Patent [19]

Hariguchi

[11] Patent Number: 4,575,447
[45] Date of Patent: Mar. 11, 1986

[54] METHOD FOR PRODUCING A WOOD-TYPE GOLF CLUB HEAD

[75] Inventor: Yoshinori Hariguchi, Shizuoka, Japan

[73] Assignee: Nippon Gakki Seizo Kabushiki Kaisha, Japan

[21] Appl. No.: 551,512

[22] Filed: Nov. 15, 1983

Related U.S. Application Data

[63] Continuation-in-part of Ser. No. 516,800, Jul. 25, 1983, abandoned.

[30] Foreign Application Priority Data

Jul. 29, 1982 [JP] Japan .................................. 57-132746

[51] Int. Cl.⁴ ........................ B29C 49/02; B29D 9/00
[52] U.S. Cl. .................................... 264/516; 264/512; 273/167 H
[58] Field of Search ............... 264/510, 512, 513, 515, 264/516; 273/167 H

[56] References Cited

U.S. PATENT DOCUMENTS

| | | | |
|---|---|---|---|
| 2,300,441 | 11/1942 | Voit et al. ............................ | 264/512 |
| 3,087,207 | 4/1963 | Styra ................................. | 264/516 X |
| 3,135,640 | 6/1964 | Kepka et al. ...................... | 264/512 X |
| 3,270,111 | 8/1966 | Haldemann ....................... | 264/516 X |
| 3,493,240 | 2/1970 | Jenks ................................. | 264/516 X |
| 4,314,964 | 2/1982 | Ferrary ............................. | 264/513 X |

FOREIGN PATENT DOCUMENTS

| | | | |
|---|---|---|---|
| 2827574 | 1/1980 | Fed. Rep. of Germany ...... | 264/512 |
| 936553 | 9/1963 | United Kingdom ............... | 264/512 |

Primary Examiner—Jan Silbaugh
Attorney, Agent, or Firm—Lerner, David, Littenberg, Krumholz & Mentlik

[57] ABSTRACT

In production of a core-shell type golf club head, a thermoplastic synthetic resin core preferably of 15° C. or higher glass transition point is used as a substitute for the conventional rubber air bag for stable and reliable shaping of an FRP shell even under the room temperature condition and beautiful moulding of the shell through softening and inflation of the core at heat pressing, thereby avoiding air void generation and layer separation in the FRP shell.

7 Claims, 7 Drawing Figures

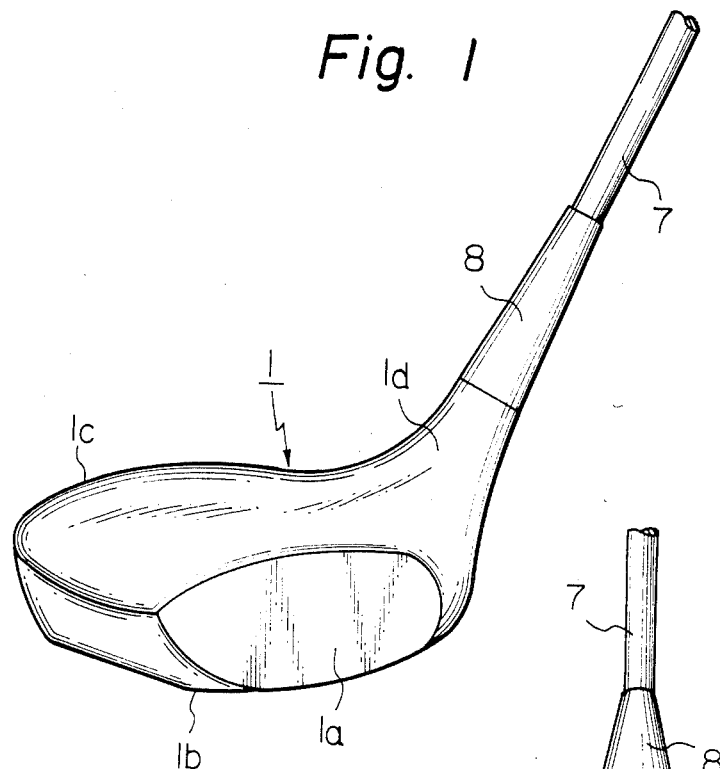
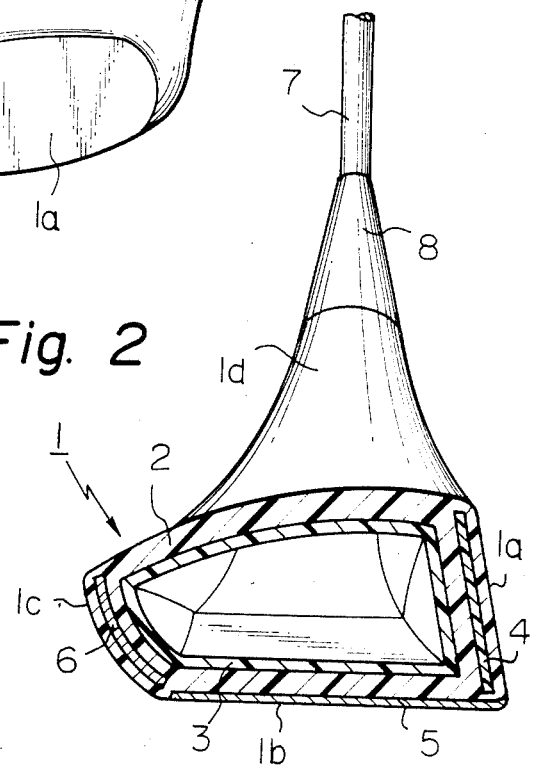

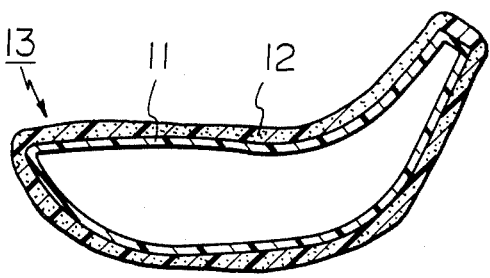
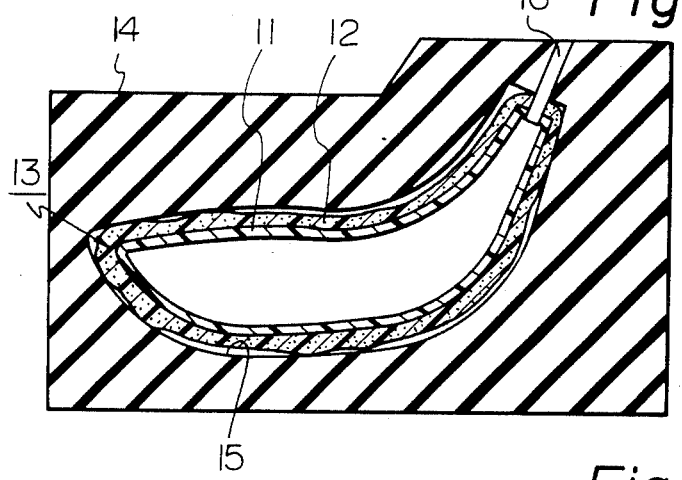
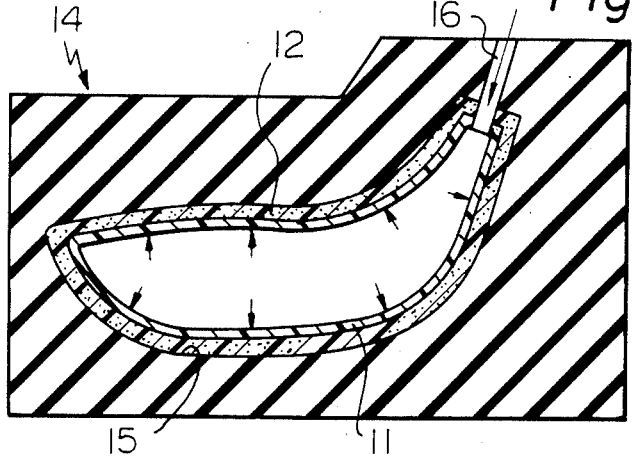

METHOD FOR PRODUCING A WOOD-TYPE GOLF CLUB HEAD

This is a continuation-in-part of application Ser. No. 516,800 filed July 25, 1983, now abandoned.

BACKGROUND OF THE INVENTION

The present invention relates to improved method for producing a wood-type golf club head, and more particularly relates to improvement in production of a wood-type golf club head including a shell made of fiber reinforced plastics.

One example of such a wood-type golf club head is disclosed in Japanese Patent Publication Sho. 51-21436. This golf head club includes a shell made of fiber reinforced plastics and a synthetic resin foam core filled in the cavity of the shell. Production of such a golf club head, however, is conventionally accompanied with various operational difficulties caused by the complicated configuration of club heads in general.

As well known, the cavity of a mould used for shaping the shell of a club head usually has a fixed dimension adapted for that club head. Variations in size and/or total amount of materials making up an unfinished club head and/or operational variance in combination of these materials tend to cause insufficient pressure to act on the fiber reinforced material filling the cavity of a mould at heat pressing, and such insufficient and unstable pressure application is liable to cause poor interlayer connection in a laminated fiber reinforced plastics construction and increased generation of air voids at borders of the layers and/or in the surface area of the obtained club head, thereby degrading the commercial value of the products.

In order to avoid such disadvantages arising from pressure deficienty at heat pressing in a mould, use of a rubber air bag in a mould is proposed. That is, the rubber air bag is first covered with fiber reinforced plastic material and, after placing in the cavity of the mould, pressurized fluid such as air is introduced into the bag which inflates to press the fiber reinforced plastic material against the wall of the cavity of mould. In this case, however, it is impossible to provide the fiber reinforced plastic covering with a configuration close to the shape of the mould cavity wall before introduction of the pressurized fluid into the rubber air bag and, as a consequence, the fiber reinforced plastic covering can hardly follow the mould cavity wall with complete fidelity when the latter is relatively complicated in shape.

SUMMARY OF THE INVENTION

It is the object of the present invention to produce a wood-type golf club head whose fiber reinforced plastic shell has a configuration correctly reproducing the shape of the cavity wall of a mould used for the production.

In accordance with the basic aspect of the present invention, a cavitious unfinished core is made of thermoplastic synthetic resin, the unfinished core is covered with an unfinished shell made of fiber reinforced plastics to form an unfinished club head, and the unfinished club head is subjected to heat pressing in a mould in order to press the unfinished shell against the mould cavity wall via inflation of the unfinished core. This inflation at heat pressing of the unfinished core may be caused by thermal expansion of air initially confined in the unfinished core or by later introduction of pressurized medium into the unfinished core placed in the mould cavity.

BRIEF DESCRIPTION OF THE DRAWINGS

FIG. 1 is a perspective view of one example of the golf club head produced by the method in accordance with the present invention, FIG. 2 is side view, partly in section, of the golf club head shown in FIG. 1, FIGS. 3 to 5 are sectional views for showing one embodiment of the method of the present invention.

DESCRIPTION OF THE PREFERRED EMBODIMENTS

Figure 6:
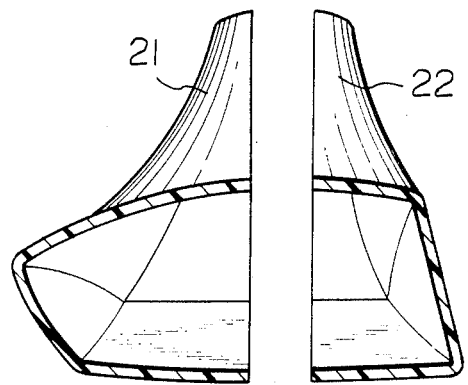
FIGS. 6 and 7 are sectional views for showing another embodiment of the method of the present invention.

One typical example of the golf club head produced by the method of the present invention is shown in FIG. 1, in which a club head 1 is made up of a cavitious core 3 made of thermoplastic synthetic resin and a shell 2 made of fiber reinforced plastics, and its configuration is defined by a face side 1a, a sole side 1b, a back side 1c and a neck section 1d. As shown in FIG. 2 the face side 1a includes a face plate 4 which is usually made of hardened plastics reinforced by carbon fibers. The sole side 1b is covered with a sole plate 5 made of metal such as brass. Likewise, a back plate 6 made of metal is embedded in the back side 1c when required. A club shaft 7 extends through and is fixed to the neck section 1d by assistance of a protector 8.

As described already, the method of the present invention includes preparation of an unfinished club head and heat pressing of such an unfinished club head.

Now referring to FIGS. 3 to 5, an unfinished club head 13 is made up of an unfinished cavitious core 11 and an unfinished shell 12. The unfinished core 11 is made of thermoplastic synthetic resin such as polyethylene, polypropylene and polyvinyl chloride. Preferably, the glass transition temperature of the thermoplastic synthetic resin used for the unfinished core should be 15° C. or higher, or preferably it should be $-20°$ C. or higher. If the glass transition temperature is lower than $-20°$ C., the tensile modulus of the thermoplastic synthetic resin to be used for the unfinished core should be $2 \times 10^9$ dynes/cm$^2$ or larger.

The unfinished core 11 is then covered with the unfinished shell 12 which is made of fiber reinforced plastics. More specifically, superimposed fibrous layers are prepared in a pre-preg state or are impregnated with a liquid synthetic resin and are laid on the core. When a surface mat or woven fabric such as satin weave is used for the outermost fibrous layer of the fiber reinforced plastics, the unfinished shell well follows the mould cavity wall at heat pressing and the resultant club head is provided with ideal surface smoothness with high elastic response at hitting balls.

Use of the thermoplastic synthetic resin of higher glass transition temperature than that of rubber or elastomers provides the cavitious unfinished core with high shape retainability even under the room temperature condition. So, at covering of the unfinished core with the unfinished shell made of superimposed fibrous layers, it is not required to keep the shape of the unfinished core by introduction of pressurized fluid which has been unavoidably employed in the case of the conventional or elastomer air bag. The same result is expected when the core is made of a thermoplastic resin having a tensile modulus of $2 \times 10^9$ dynes/cm$^2$ or larger. Depending on the thickness of the unfinished core and shell, however, some pressurized fluid such as air may be introduced into the unfinished core prior to covering with the unfinished shell.

The unfinished club head 13 thus prepared is then placed in position in the cavity 15 of a mould 14 for heat pressing as shown in FIG. 4. Next the unfinished core 11 is inflated to press the unfinished shell against the wall of the mould cavity 15. In one embodiment, pressurized medium such as air, steam and oil is introduced into the unfinished core through an injection port 16 formed in the mould so that the unfinished core 11 softened by heat pressing should be inflated as shown in FIG. 5. In another embodiment, the air confined in the unfinished core during its preparation (see FIG. 3) expands during the heat pressing to inflate the unfinished core. Either of the two types of inflation may be selectively employed depending on the kind of the synthetic resin used for the unfinished core. Further, softening of the unfinished core may be effected by either temperature rise at heat pressing itself or separate heating of the mould depending on the material combination of the unfinished club head.

Figure 7:
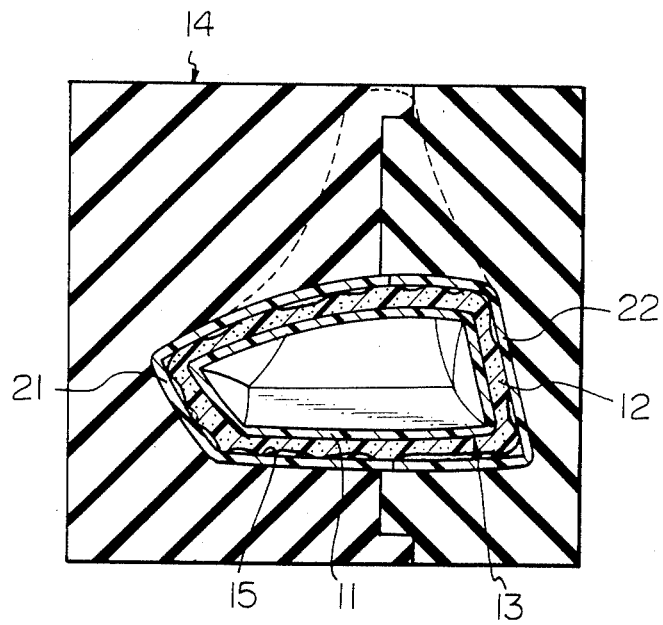

In the case of the instant embodiment, the unfinished club head made up of a core and a shell is directly placed in position in a mould cavity. In an alternative embodiment shown in FIGS. 6 and 7, the unfinished club head 13 is further covered with an additional thin outermost shell made of fiber reinforced plastics. More specifically, separately from preparation of the unfinished club head 13, the outermost shell fractions 21 and 22 are prepared by heat pressing in a proper mould. In the case of the illustrated embodiment, the fractions 21 and 22 cover the front and rear halves of the entire configuration. On case-by-case basis, however, the entire configuration may be divided into three or more fractions. The unfinished club head 13 is fully covered with the fractions 21 and 22, and they are placed together in position in the mould cavity for heat pressing as shown in FIG. 7.

In accordance with the present invention, use of an unfinished cavitious core made of thermoplastic synthetic resin preferably of a glass transition temperature of 15° C. or higher, or preferably a glass transition temperature of $-20°$ C. or higher, or a tensile modulus of $2 \times 10^9$ dynes/cm$^2$ or larger enables the unfinished shell to assume, even under room temperature condition, a shape close to the complicated configuration of the end product, which connects to ideal moulding effect. This advantage is further amplified by inflation of the unfinished core during heat pressing which strongly forces the unfinished shell to uniformly and beautifully follow the wall of the mould cavity. In addition, generation of air voids and layer separation in the fiber reinforced plastic shell can be well avoided.

I claim:

1. Improved method for producing a wood-type golf club head of predetermined shape comprising
    providing a mould having cavity walls defining a predetermined shape,
    forming a cavitious unfinished core from thermoplastic synthetic resin, said unfinished core having an initial shape conforming substantially to said predetermined shape of said cavity walls,
    covering said unfinished core with an unfinished shell made of fiber reinforced plastics while maintaining said shape of said unfinished core to form an unfinished club head,
    placing said unfinished club head within said mould, and
    subjecting said unfinished club head within said mould to heat pressing at a temperature to cause softening thereof and to achieve inflation of said unfinished core by internal pressure within said unfinished core during said heat pressing so as to conform the shape of said unfinished club head to said predetermined shape defined by said cavity walls.

2. Improved method as claimed in claim 1 further comprising
    covering said unfinished club head, prior to said heat pressing, with an outermost shell made of fiber reinforced plastics.

3. Improved method as claimed in claim 1 or 2 in which
    said unfinished core is made of a thermoplastic resin whose glass transition temperature is $-20°$ C. or higher.

4. Improved method as claimed in claim 1 or 2 in which
    pressurized medium is introduced into said unfinished core for said inflation.

5. Improved method as claimed in claim 1 or 2 in which
    additional heat is applied to said mould for said softening of said unfinished core.

6. Improved method as claimed in claim 1 or 2, in which the unfinished core is made of a thermoplastic resin whose tensile modulus is $2 \times 10^9$ dyne/cm$^2$ or larger.

7. A method for producing a golf club head of predetermined shape comprising
    providing a mould having cavity walls defining a predetermined shape,
    forming a hollow core from thermoplastic resin, said core having an initial shape conforming substantially to said predetermined shape of said cavity walls,
    covering said core with a shell made of fiber reinforced plastics to form an unfinished club head conforming substantially to said predetermined shape of said cavity walls,
    placing said unfinished club head within said mould, and
    subjecting said unfinished club head within said mould to heat at a temperature to cause softening thereof and to achieve inflation of said core by internal pressure within said core during the application of said heat so as to conform the shape of said unfinished club head to said predetermined shape defined by said cavity walls.

* * * * *